No. 746,270. PATENTED DEC. 8, 1903.
E. G. BENNETT & A. G. HUNTING.
CURTAIN CORD WINDER.
APPLICATION FILED JUNE 27, 1903.
NO MODEL.
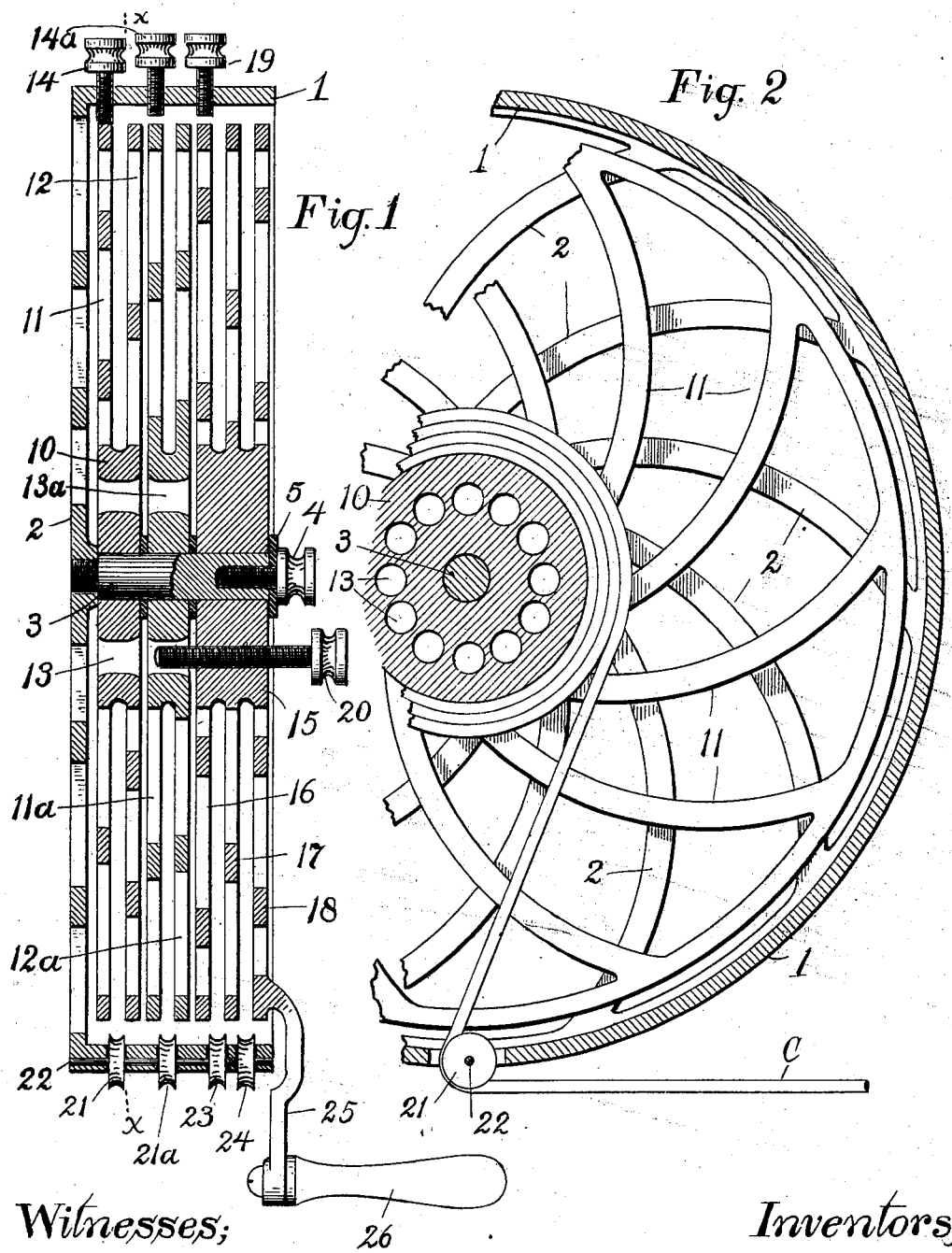
Witnesses;
Inventors;
Edwin G. Bennett,
Arthur G. Hunting,
By A. B. Upham,
His Attorney.
THE NORRIS PETERS CO., PHOTO-LITHO., WASHINGTON, D. C.

No. 746,270. Patented December 8, 1903.

UNITED STATES PATENT OFFICE.

EDWIN G. BENNETT, OF EVERETT, AND ARTHUR G. HUNTING, OF FITCHBURG, MASSACHUSETTS.

CURTAIN-CORD WINDER.

SPECIFICATION forming part of Letters Patent No. 746,270, dated December 8, 1903.

Application filed June 27, 1903. Serial No. 163,345. (No model.)

*To all whom it may concern:*

Be it known that we, EDWIN G. BENNETT, of Everett, and ARTHUR G. HUNTING, of Fitchburg, Massachusetts, both citizens of the United States, have invented certain new and useful Improvements in Curtain-Cord Winders, of which the following is a full, clear, and exact description.

The object of our invention is the construction of a winding device by means of which the cords controlling a number of shades or curtains may be wound and unwound simultaneously and all or any one thereof locked at any point and the curtains thereby raised and lowered together or instantly fixed at the same height or with equal readiness may be secured at different heights.

Referring to the drawings forming part of this specification, Figure 1 is a central transverse section of our winding device; and Fig. 2 is a sectional view on the line X X in Fig. 1, one-half of the device being represented as broken away.

Our winding device comprises a case or cage 1, designed to be secured to a wall or other suitable support, and a series of reels 10, 10$^a$, and 15, revoluble within such case, the outermost reel 15 being provided with a turning-handle 26 and a locking-screw 20 for locking the reels together. Said case or cage consists simply of an annular rim and a back, the latter being skeletonized for the sake of lightness and economy and such skeletonizing being done by having the greater part of the back composed of spokes 2, preferably curved, as shown in Fig. 2.

The reels 10 10$^a$ are alike, and each comprises a hub having openings or holes 13 or 13$^a$ therein, arranged in a circle concentric with the supporting-spindle 3, and flanges or sides 11 12 or 11$^a$ 12$^a$. The sides 11 12 are located at a distance apart to properly receive a curtain-cord C between them, while the openings or holes 13 are made large enough to easily receive the locking-screw 20. For the sake of lightness and economy these sides are also skeletonized, being composed of curved spokes joining a slender rim.

The outer reel 15 is not formed with the holes 13 13$^a$, but instead has the screw 20 tapped therein at a point to enter said holes, as shown in Fig. 1. This outer reel is further provided with an arm 25, cast as a part thereof, and a turning-handle 26 at the extremity of said arm. Another difference over the other reels consists in making the reel 15 a double one by giving it in addition to the sides 16 and 18 a central divisional partition 17, thereby enabling it to receive two cords in place of the one alone of each of the other reels. This difference is not made, however, because of its being the outermost reel; but it is so shown in the drawings simply to illustrate a reel made with a plurality of cord-receivers.

In the peripheral side or rim of the cage are rotatably supported a series of small grooved pulleys 21 21$^a$ 23 24, located to guide the different cords C to their respective reels. These pulleys are preferably located in slots in said rim and mounted on a common pintle 22, penetrating them all. At another point in said rim are the set-screws 14, 14$^a$, and 19, constructed to be screwed down into contact with the rims of the reels and to thereby lock the latter in any desired position. The reels are secured upon the spindle 3 by means of the screw 4 and washer 5, said screw being tapped into the end of said spindle.

Normally the locking-screw 20 penetrates all the reels, so that all are turned by the handle 26; but in case the different curtain-cords do not wind up alike through an unavoidable error in fastening the cord ends to the reels and the curtains thereby fail to be raised or lowered to exactly the same height then the reels can be adjusted in the following manner and a uniformity on the part of the curtains be obtained. If it is a failure of the curtains to roll up to the same height and the lowest curtain is that controlled by the reel 10, then the handle 26 is turned until this lowest curtain is at the proper point and the others are of course at a higher level. Then the set-screw 14 is set down against the rim of said reel 10 to fix it at such point and the locking-screw 20 turned until its inner end is free of said reel. The other reels are now permitted to rotate and their cords unwind until their curtains have descended to the proper height and then the locking-screw advanced into the nearest hole 13 of the reel 10 and all the reels locked together as they were originally. If, however, these latter curtains were themselves uneven, the same process is gone through with, the handle 26 being turned to wind the curtain connected with the reel 10$^a$, either up or down, until on the same level with the first curtain and the set-screw 14$^a$ caused to lock this reel in position. Then the locking-screw 20 is further withdrawn to remove it from the reel 10$^a$ and the reel 15 turned to bring its connected curtain upon the level with the others, after which the locking-screw is returned through the nearest alining holes 13 13$^a$ of the reels 10 10$^a$.

It often happens that one or two windows should have their curtains dropped to permit the window decorator to work unseen. To do this, it is only necessary to turn the handle 26 to unwind all the curtain-cords and having removed the locking-screw 20 from engagement with the reel or reels of the curtains to be kept closed to wind up the other curtains and fasten their reel or reels with their set-screws 14$^a$ or 19. In the same manner if the sun is still shining in one window and not in the others the curtain of the one window may be lowered while the others are left up. A simpler manner than that just described for wholly or partially lowering one or two of the curtains, provided the weight thereof is enough to unwind the reels, is to fasten with the set-screws 14, 14$^a$, or 19 the reel or reels of the curtain or curtains which are to remain up, withdraw the locking-screw 20 from locking the reels together, and then cautiously ease up on the set-screw of the reel whose curtain is to be lowered until gravity has brought the latter to the desired position, when the set-screw is made to lock such reel immediately in place.

In case a curtain is provided with two cords, as often happens, these two cords are wound upon the double reel 15.

What we claim as our invention, and for which we desire Letters Patent, is as follows, to wit:

1. In a curtain-cord winder, the combination of a plurality of reels each having wound thereon one or more cords from a curtain, said reels being mounted on a common spindle, a locking device for locking two or more of said reels together, fastening devices for the reels, and means for turning one of the reels, substantially as described.

2. In a curtain-cord winder, the combination with an inclosing case comprising an annular rim and a back, of a spindle rigidly held by said back, a deeply-grooved reel mounted on said spindle, a crank arm and handle rigid with said reel, a set-screw penetrating said rim and adapted to engage and fasten said reel in position, and a small grooved pulley rotatable in a slot in said rim in line with the groove of said reel, substantially as described.

3. In a curtain-cord winder, the combination of a plurality of reels, and a supporting-spindle common to all, one reel having an operating-handle and an elongated locking device parallel with said spindle, the other reels having each a circular series of holes arranged to receive said elongated locking device, substantially as described.

4. In a curtain-cord winder, the combination with a partially-inclosing circular case having the central spindle, of a plurality of reels mounted on said spindle, the outermost of said reels having the crank-handle for its operation and the elongated locking device, the remainder of said reels having a circular series of holes arranged to receive said elongated locking device, and the rim of said case having the set-screws engaging said reels, substantially as described.

In testimony that we claim the foregoing invention we have hereunto set our hands this 24th day of June, 1903.

EDWIN G. BENNETT.
ARTHUR G. HUNTING.

Witnesses:
WALTER PERLEY HAY,
CHARLES F. BAKER.